United States Patent
Wolfe et al.

(10) Patent No.: US 9,971,996 B2
(45) Date of Patent: *May 15, 2018

(54) SYSTEM AND METHOD FOR PROCESSING CLOSED LOOP CARDS AT A MERCHANT POINT OF SALE

(71) Applicant: GIFTCODES.COM LLC, Pittsburgh, PA (US)

(72) Inventors: Jason Wolfe, Sewickley, PA (US);
Mark Romanelli, Bridgeville, PA (US);
Sanjay Akut, Pittsburgh, PA (US);
Mike Kelly, Langhorne, PA (US);
Mary Jane Kelly, Langhorne, PA (US)

(73) Assignee: GIFTCODES.COM, LLC, Pittsburgh, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/620,489

(22) Filed: Jun. 12, 2017

(65) Prior Publication Data

US 2017/0323275 A1 Nov. 9, 2017

Related U.S. Application Data

(63) Continuation of application No. 14/472,908, filed on Aug. 29, 2014, now Pat. No. 9,679,277, which is a (Continued)

(51) Int. Cl.
*G07F 19/00* (2006.01)
*G06K 5/00* (2006.01)
(Continued)

(52) U.S. Cl.
CPC .......... *G06Q 20/085* (2013.01); *G06Q 20/10* (2013.01); *G06Q 20/20* (2013.01); *G06Q 20/28* (2013.01);
(Continued)

(58) Field of Classification Search
CPC ...... G06Q 20/00; G06Q 20/027; G06Q 20/10; G06Q 20/20; G06Q 20/34; G06Q 30/02;
(Continued)

(56) References Cited

U.S. PATENT DOCUMENTS 4,809,837 A   3/1989 Hayashi
5,960,411 A   9/1999 Hartman
(Continued)

FOREIGN PATENT DOCUMENTS

WO   WO 2008/013945   1/2008

OTHER PUBLICATIONS

Offenberg. "Markets: Gift Cards"; Journal of Economic Perspectives. vol. 21, No. 2, Spring 2007 [Retrieved from the Internet] <URL: http://myweb.lmu.edu/jpate/JEP_2007.pdf>. pp. 227-238.
(Continued)

*Primary Examiner* — Thien M Le
*Assistant Examiner* — April Taylor

(57) ABSTRACT

Disclosed herein are systems, methods, and computer-readable storage media for redeeming a closed loop card/code funded with an amount of money. The system receives, at a merchant, an indication from a consumer of a desire to sell a closed loop account not issued by the merchant and receives a confirmation, via a computing device, of an amount of money in the closed loop account. The system presents the consumer with an offer to buy the closed loop account and receives from the consumer an acceptance of the offer. The system processes the closed loop account to yield a processed closed loop account such as by transferring the account to one of the merchant and an entity and applies a benefit to the consumer based on the processed closed loop account.

21 Claims, 5 Drawing Sheets

Related U.S. Application Data continuation of application No. 12/702,610, filed on Feb. 9, 2010, now Pat. No. 8,820,634, which is a continuation-in-part of application No. 12/573,056, filed on Oct. 2, 2009, now Pat. No. 8,631,999.

(60) Provisional application No. 61/207,125, filed on Feb. 9, 2009, provisional application No. 61/211,394, filed on Mar. 28, 2009, provisional application No. 61/939,241, filed on Feb. 12, 2014.

(51) Int. Cl.
| | |
|---|---|
| G06Q 20/08 | (2012.01) |
| G06Q 20/28 | (2012.01) |
| G06Q 30/02 | (2012.01) |
| G06Q 20/10 | (2012.01) |
| G06Q 20/20 | (2012.01) |
| G06Q 20/34 | (2012.01) |

(52) U.S. Cl.
CPC ............ *G06Q 20/34* (2013.01); *G06Q 30/02* (2013.01); *G06Q 30/0207* (2013.01); *G06Q 30/0208* (2013.01); *G06Q 30/0213* (2013.01)

(58) Field of Classification Search
CPC ........... G06Q 30/0207; G06Q 30/0208; G06Q 30/0213; G06Q 30/0217; G06Q 30/0268
See application file for complete search history.

(56) References Cited

U.S. PATENT DOCUMENTS

| | | | |
|---|---|---|---|
| 7,424,452 B2 | 9/2008 | Feilbogen et al. | |
| 7,494,048 B2 | 2/2009 | Gusler et al. | |
| 7,527,192 B1 | 5/2009 | Chaskin et al. | |
| 7,624,921 B1 | 12/2009 | Beck et al. | |
| 7,941,344 B1 | 5/2011 | Bickerstaff | |
| 8,152,060 B2 | 4/2012 | Wolfe et al. | |
| 8,152,061 B2 | 4/2012 | Wolfe et al. | |
| 8,229,851 B2 | 7/2012 | Doran et al. | |
| 8,285,643 B2 | 10/2012 | Isaacson et al. | |
| 8,401,957 B2 | 3/2013 | Forlai | |
| 8,463,661 B2 | 6/2013 | Blair et al. | |
| 8,500,007 B2 * | 8/2013 | Wolfe | G06Q 20/06 235/380 |
| 8,528,814 B2 | 9/2013 | Wolfe et al. | |
| 8,631,999 B2 * | 1/2014 | Wolfe | G06Q 20/10 235/379 |
| 8,733,637 B1 | 5/2014 | Cedeno | |
| 8,820,634 B2 * | 9/2014 | Wolfe | G06Q 20/20 235/379 |
| 8,887,998 B2 * | 11/2014 | Wolfe | G06Q 20/28 235/379 |
| 9,016,567 B2 | 4/2015 | Wolfe | |
| 9,547,856 B2 | 1/2017 | Wolfe | |
| 9,679,277 B2 | 6/2017 | Wolfe | |
| 2001/0007098 A1 | 7/2001 | Hinrichs et al. | |
| 2002/0046255 A1 | 4/2002 | Moore et al. | |
| 2002/0065713 A1 | 5/2002 | Awada et al. | |
| 2003/0004828 A1 | 1/2003 | Epstein | |
| 2004/0078325 A1 | 4/2004 | O'Connor | |
| 2004/0219971 A1 | 11/2004 | Ciancio et al. | |
| 2005/0038714 A1 | 2/2005 | Bonet et al. | |
| 2005/0171902 A1 | 8/2005 | Nguyen | |
| 2005/0177493 A1 | 8/2005 | Sung | |
| 2005/0228717 A1 | 10/2005 | Gusler et al. | |
| 2006/0037835 A1 | 2/2006 | Doran et al. | |
| 2006/0190337 A1 | 8/2006 | Ayers et al. | |
| 2006/0190347 A1 | 8/2006 | Cuervo | |
| 2007/0055568 A1 | 3/2007 | Osborne | |
| 2007/0075134 A1 | 4/2007 | Perlow et al. | |
| 2007/0156513 A1 | 7/2007 | Mastrianni et al. | |
| 2007/0205269 A1 | 9/2007 | Lindon | |
| 2007/0272736 A1 | 11/2007 | Brooks et al. | |
| 2007/0284433 A1 | 12/2007 | Domenica et al. | |
| 2008/0027810 A1 | 1/2008 | Lerner et al. | |
| 2008/0162271 A1 | 7/2008 | Benjamin | |
| 2008/0162299 A1 | 7/2008 | Gusler et al. | |
| 2008/0208688 A1 | 8/2008 | Byerley et al. | |
| 2008/0294518 A1 | 11/2008 | Weiss et al. | |
| 2008/0296368 A1 | 12/2008 | Newsom | |
| 2009/0030789 A1 | 1/2009 | Mashinsky | |
| 2009/0074167 A1 | 3/2009 | Evans et al. | |
| 2009/0171773 A1 | 7/2009 | Shastry | |
| 2009/0265269 A1 | 10/2009 | Stoecker | |
| 2009/0283594 A1 | 11/2009 | Walton | |
| 2010/0010888 A1 | 1/2010 | Maetz | |
| 2010/0057580 A1 | 3/2010 | Raghunathan | |
| 2010/0063872 A1 | 3/2010 | Patel | |
| 2010/0070290 A1 | 3/2010 | Marturana et al. | |
| 2010/0076833 A1 | 3/2010 | Nelsen | |
| 2010/0198726 A1 | 8/2010 | Doran et al. | |
| 2010/0280921 A1 | 11/2010 | Stone et al. | |
| 2010/0299194 A1 | 11/2010 | Snyder et al. | |
| 2010/0318415 A1 | 12/2010 | Gottlieb | |
| 2011/0029370 A1 | 2/2011 | Roeding et al. | |
| 2011/0079644 A1 | 4/2011 | Wolfe et al. | |
| 2011/0099104 A1 | 4/2011 | Nybom | |
| 2011/0106698 A1 | 5/2011 | Isaacson et al. | |
| 2011/0178862 A1 | 7/2011 | Daigle | |
| 2011/0178924 A1 | 7/2011 | Briscoe et al. | |
| 2011/0213674 A2 | 9/2011 | Shpun et al. | |
| 2011/0246284 A1 | 10/2011 | Chaikin et al. | |
| 2011/0288978 A1 | 11/2011 | Abifaker | |
| 2011/0295705 A1 | 12/2011 | Kasmei | |
| 2012/0016725 A1 | 1/2012 | Kraft et al. | |
| 2012/0066043 A1 | 3/2012 | Carmichael et al. | |
| 2012/0072298 A1 | 3/2012 | Ramanujam et al. | |
| 2012/0109787 A1 | 5/2012 | Larrick | |
| 2012/0123832 A1 | 5/2012 | Nicolaidis et al. | |
| 2012/0123833 A1 | 5/2012 | Nicolaidis et al. | |
| 2012/0123834 A1 | 5/2012 | Nicolaidis et al. | |
| 2012/0123922 A1 | 5/2012 | Nicolaidis et al. | |
| 2012/0123923 A1 | 5/2012 | Nicolaidis et al. | |
| 2012/0150643 A1 | 6/2012 | Wolfe et al. | |
| 2012/0173402 A1 | 7/2012 | Nicolaidis | |
| 2012/0185394 A1 | 7/2012 | Gelfand | |
| 2012/0246019 A1 | 9/2012 | Wolfe | |
| 2012/0303425 A1 | 11/2012 | Katzin et al. | |
| 2013/0073388 A1 | 3/2013 | Heath | |
| 2013/0073459 A1 | 3/2013 | Zacarias et al. | |
| 2013/0197986 A1 | 8/2013 | Roberts et al. | |
| 2013/0204681 A1 | 8/2013 | Kraft et al. | |
| 2013/0254074 A1 | 9/2013 | Joa et al. | |
| 2013/0254086 A1 | 9/2013 | Joa et al. | |
| 2013/0268413 A1 | 10/2013 | Burr et al. | |
| 2013/0284805 A1 | 10/2013 | Kraft et al. | |
| 2014/0006129 A1 | 1/2014 | Heath | |
| 2014/0012640 A1 | 1/2014 | Roberts et al. | |
| 2014/0058934 A1 | 2/2014 | Smith et al. | |
| 2014/0081852 A1 | 3/2014 | Blackhurst et al. | |
| 2014/0101044 A1 | 4/2014 | Blackhurst et al. | |
| 2014/0114842 A1 | 4/2014 | Blackhurst et al. | |
| 2014/0229319 A1 | 8/2014 | Roberts et al. | |

OTHER PUBLICATIONS

Swapagift.com Expands its "Cash for Your Card" program. Retrieved from http://www.prweb.com/releases/2003/12/prweb96305.htm on Nov. 9, 2011.

Swapathing, Inc. Announces the Internet's First Online Gift Card Exchange. Retrieved from http://www.prweb.com/releases/2003/10/prweb83758.htm on Nov. 9, 2011.

Cash for your card now! Retrieved from 222.swapagift.com on Nov. 9, 2011.

"What is SwapAGift.com?" retrieved from http://www.swapagift.com/ on Oct. 25, 2011.

Ernstberger, Kathryn W., D. McDowell, and J. Parris. "Impact of Closed-Loop Gift Card Promotions by Businesses." International Journal of Business and Social Research 2.6 (2012): 190-197.

(56) References Cited

OTHER PUBLICATIONS

"2010 U.S. Gift Card Consumer Insights Study," dated Mar. 2011, published by First Data Corporation.

* cited by examiner

SYSTEM AND METHOD FOR PROCESSING CLOSED LOOP CARDS AT A MERCHANT POINT OF SALE

PRIORITY CLAIM

The present application is a continuation of U.S. application Ser. No. 14/472,908, filed Aug. 29, 2014, which is a continuation of U.S. application Ser. No. 12/702,610, filed Feb. 9, 2010, now U.S. Pat. No. 8,820,634, which is a continuation-in-part of U.S. application Ser. No. 12/573,056, filed Oct. 2, 2009, now U.S. Pat. No. 8,631,999, which claims priority to Provisional Application 61/207,125, filed Feb. 9, 2009, and Provisional Application 61/211,394, filed Mar. 28, 2009. The contents of each of which are herein incorporated by reference in their entireties.

The prior application Ser. No. 14/472,908, filed Aug. 29, 2014 also claims priority to Provisional Application No. 61/939,241, filed Feb. 12, 2014. The contents of which are herein incorporated by reference in their entireties.

RELATED APPLICATIONS

This application is related to U.S. application Ser. No. 12/702,600, filed Feb. 9, 2010, U.S. application Ser. No. 12/702,623, filed Feb. 9, 2010, and U.S. application Ser. No. 12/701,711, filed Feb. 8, 2010. This application is also related to U.S. Pat. No. 8,152,060. The content of each of the above reference patent applications and patent is incorporated herein by reference.

BACKGROUND

1. Technical Field

The present disclosure relates to processing closed loop card/codes and more specifically to accepting closed loop card/codes of other merchants at any merchant point of sale.

2. Introduction

Gift card/codes are widely used as gifts for birthdays, Christmas, and other holidays. Gift card/codes are closed loop card/codes, meaning that the value represented by a gift card/code is a valid form of payment at a closed set of retailers. For example, an Outback Steakhouse® gift card/code is only redeemable at Outback Steakhouse® and not at Planet Hollywood® or Target®. Some closed loop card/codes are valid at a family of closely related or commonly owned merchants. For example, a Darden Restaurants gift card/code is valid at Red Lobster® and Olive Garden®, or a local mall gift card/code is valid at tenant merchants in the local mall. Open loop card/codes, in contrast, are a valid form of payment at virtually every retailer nationwide, such as Visa® or Mastercard/Code® debit card/codes.

While gift card/codes are a popular alternative to giving cash or a merchandise item which the recipient may not like, the recipient may not be able to redeem the gift card/code due to geographic limitations, personal disinterest in the merchant who issued the gift card/code, or other reasons. Additionally, some merchants issue gift card/codes with significant restrictions, complex fees, and/or an expiration date. According to one estimate, consumers purchase about $80 billion worth of gift card/codes annually in the U.S. and roughly 10%, or $8 billion, of that amount goes unredeemed. Consumers waste these unredeemed funds and do not benefit from the full value of the gift card/code. Further, if these funds are not spent, they can escheat to the state. Merchants may lose prospective sales if potential customers are holding funds which are only redeemable at competitor businesses.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for redeeming a closed loop card/code funded with an amount of money. The system can be a computing device configured to practice the method. The system receives from a merchant point of sale an indication of use of a closed loop card/code not issued by the merchant and presented by a consumer and queries and receives a confirmation of an amount of money in an account associated with the closed loop card/code. The system queries and receives a confirmation of the amount of money from a multi-process secure gateway which communicates with one or more closed loop card/code processors. The system presents the consumer with an offer to buy the closed loop card/code at a discount price, and, upon accepting the offer, closes out the closed loop card/code and pays the discount price to the consumer. The system can apply the discount price to a purchase by the consumer at the merchant. The merchant can apply the discount by accepting payment for the product via a different vehicle (i.e. the tendered closed-loop card or code) from the customer simply paying a lower price. In other words, the merchant accepts the competitor closed loop card as full or partial payment for the merchant's goods or services. The merchant can provide cash back to the consumer for the excess value of the discount price over the purchase by the consumer at the merchant. The merchant can apply more than the offered discount price to the purchase. Paying the discount price can include applying the discount price to a merchant specific card/code of the consumer. In another aspect, the system receives, at a merchant, an indication from a consumer of a desire to sell a closed loop account not issued by the merchant and receives a confirmation, via a computing device, of an amount of money in the closed loop account. The system presents the consumer with an offer to buy the closed loop account and receives from the consumer an acceptance of the offer. The system processes the closed loop account to yield a processed closed loop account such as by transferring the account to one of the merchant and an entity and applies a benefit to the consumer based on the processed closed loop account.

Also disclosed are alternative systems, methods, and computer-readable storage media for redeeming a closed loop card/code funded with an amount of money. The system can be a computing device configured to practice the method. The system receives from a merchant an indication of use of a closed loop card/code not issued by the merchant and presented by a consumer at a merchant point of sale, queries and receives a confirmation of an amount of money in an account associated with the closed loop card/code, receives an indication from the merchant that the consumer has accepted an offer to sell the closed loop card/code, and based on the received indication, closes out the closed loop card/code and pays a second amount to the merchant. The merchant can apply a discount to a purchase by the consumer based on the amount paid to the merchant. The merchant can provide cash back to the consumer for excess value over the second amount paid to the merchant. The merchant can apply a discount greater than the second amount.

Throughout this disclosure, closed loop cards and other cards are interchangeable with a closed loop code or other code which serves the same purpose as a physical closed loop card.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
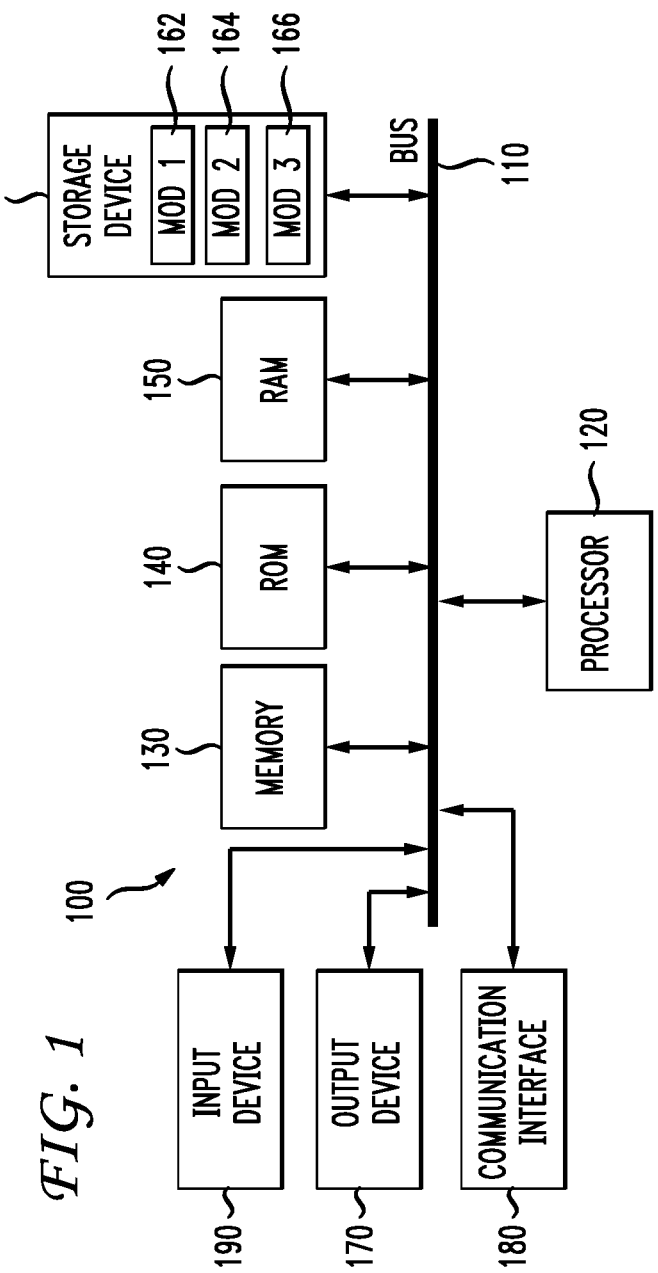
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Gift card/codes are divided into open loop and closed loop card/codes. Typically banks or credit card companies issue open loop card/codes (example: Visa, MasterCard, Amex or Discover) which can be redeemed by virtually any business entity. These differ from closed loop card/codes which are typically issued by a specific store or restaurant and can be only redeemed by the issuing provider (example: Sears, Red Lobster, Target). Gift card/codes are one common form of closed loop card/codes. The physical card/code and the card/code number associated with the card/code are interchangeable concepts. Gift card/codes can store a reference to the amount of money within a physical card/code or can store a reference to an external database of accounts which references an amount of money. One or more external database can maintain funds from which each of a set of accounts linked to a card/code can draw.

Figure 2:
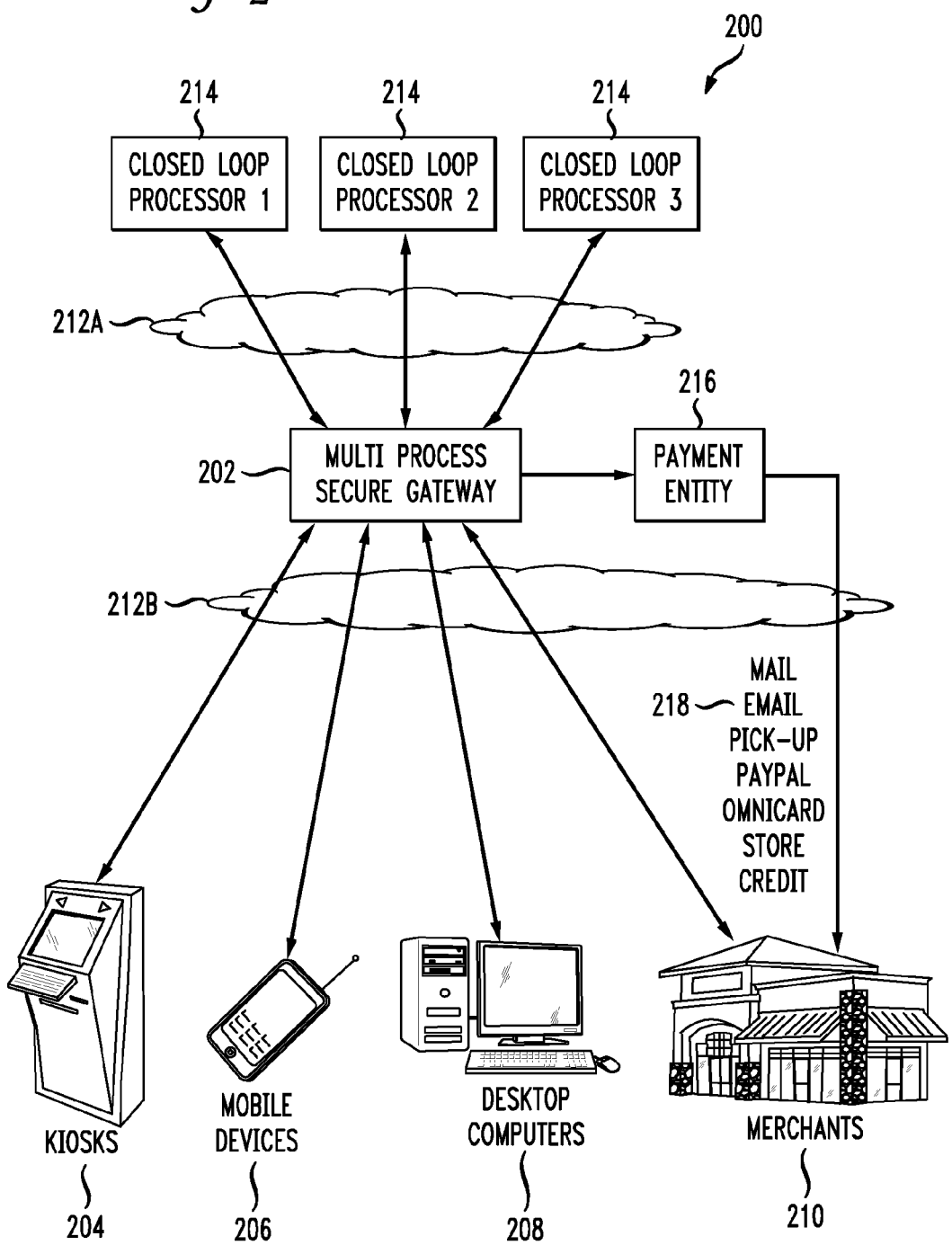
FIG. 2 illustrates a multi-process secure gateway configuration.

Having disclosed some basic system components and concepts, the disclosure now turns to the exemplary method embodiment shown in FIG. 2. For the sake of clarity, the method is discussed in terms of an exemplary system such as is shown in FIG. 1 configured to practice the method.

FIG. 2 illustrates a multi-process secure gateway configuration 200. The multi-process secure gateway 202 can be implemented as a local or remote server, a group of tightly or loosely interconnected servers, integrated as a software module within a point of sale device, or as any other suitable device, software, or combination thereof. In FIG. 2, the multi-process secure gateway 202 is shown as a single conceptual server available over a network 212B such as the public telephone network or the Internet. The multi-process secure gateway 202 interacts with various requesters, such as kiosks 204, mobile devices 206, desktop computers 208, and merchants' point of sale devices 210, which submit information uniquely identifying closed loop card/codes. Mobile device 206 also represents a standard telephone as well as communication with an interactive voice response system. Each of these devices can interact with the secure gateway 202 through different protocols, such as a direct network connection, an HTTP-based portal, SMS messages, telephone, interactive voice response systems, point-of-sale (POS) terminals, etc. In the case of merchants, each point of sale of the merchant 210 can connect to a centralized merchant server, not shown, which relays requests to the secure gateway 202 on behalf of all the merchant 210 point of sale devices. Other configurations also exist. In one aspect, this process may be called Cash4Card (name used for description purposes only). Merchants 210, kiosks 204, other devices and/or locations, including online storefronts, which provide an interface to the secure gateway 202 can provide an easily recognizable visual or other indication readily indicating to potential customers that they accept gift card/codes under the Cash4Card program. The indication can be a window sticker, an online image, or other sign displayed in a manner similar to the well-known overlapping circles for MasterCard® or the blue and orange bars over and under the word VISA®.

The secure gateway 202 interacts with multiple closed loop processors 214, such as FirstData and Chase Paymentech, over a network 212A such as the Internet. These closed loop processors are entities that process closed loop cards, such as FirstData, and are different from a computer processor such as an AMD Phenom II or Intel Core Duo. The secure gateway 202 can perform any action on the closed loop card/code through the various closed loop card/code processors 214 as if the secure gateway 202 was a closed loop merchant. The secure gateway 202 analyzes the submitted information to determine which closed loop processor handles that type of closed loop card/code. For example, a particular series of numbers or letters can indicate that one closed loop card/code is honored by Paymentech, and another distinct set of numbers or letters indicates that another closed loop card/code is honored by FirstData. The logic and analysis in the secure gateway 202 can change from time to time as new types of card/codes are issued by existing closed loop processors 214 or as the secure gateway 202 adds interfaces for new closed loop processors. The secure gateway 202 can include a common application programmer interface (API) which defines actions which may be performed through the closed loop processors 214. The API translates API calls to the corresponding specific sets of proprietary interactions with the various closed loop processors 214, which may be very different between closed loop processors 214.

The secure gateway 202 determines the balance of the closed loop card/code from the closed loop processor 214 and offers to purchase the closed loop card/code from the requestor, typically at a price lower than the amount on the card/code. If the requestor provides an indication of agreement to sell the closed loop card/code, then the secure gateway deactivates the closed loop card/code associated with the submitted information, issues a new closed loop card/code in that amount (which may be a physical closed loop card/code or a virtual closed loop card/code), and pays the purchase price to either the merchant or the requestor through a payment entity 216. Deactivation and issuance of a new card can occur via the processes set forth in incorporated U.S. Pat. No. 8,152,060 and U.S. application Ser. No. 12/702,600. The payment entity 216 may be a merchant that pays the requestor and then another entity settles with the merchant. The gateway 202 can also provide instructions to other entities to perform the deactivation, issuance, payment, and other steps. The payment entity 216 can be part of the secure gateway 202, part of a merchant point of sale equipment 210, or a separate entity altogether. The secure gateway 202 can provide additional instructions regarding how to transfer payment 218 to the requestor. Some examples of how to transfer payment include mailing a physical open loop card/code to the requestor, emailing to the requestor the necessary information to use a non-physical open loop card/code (such as an account number and PIN), notifying a local financial service to prepare an amount of money for pickup (such as MoneyGram or Western Union), transferring funds to an electronic account (such as PayPal), transferring money to a requestor's existing open loop card/code (such as an OmniCard or other debit card/code), or granting store credit to the requestor. The payment entity 216 can also provide payment to the requestor using other suitable approaches.

In connection with the transaction, a user can dispose of the closed loop card by inserting it into a slot on a kiosk 204, surrendering the physical card at a merchant 210, or dropping the card in a bin for later collection and recycling, for example.

Figure 3:
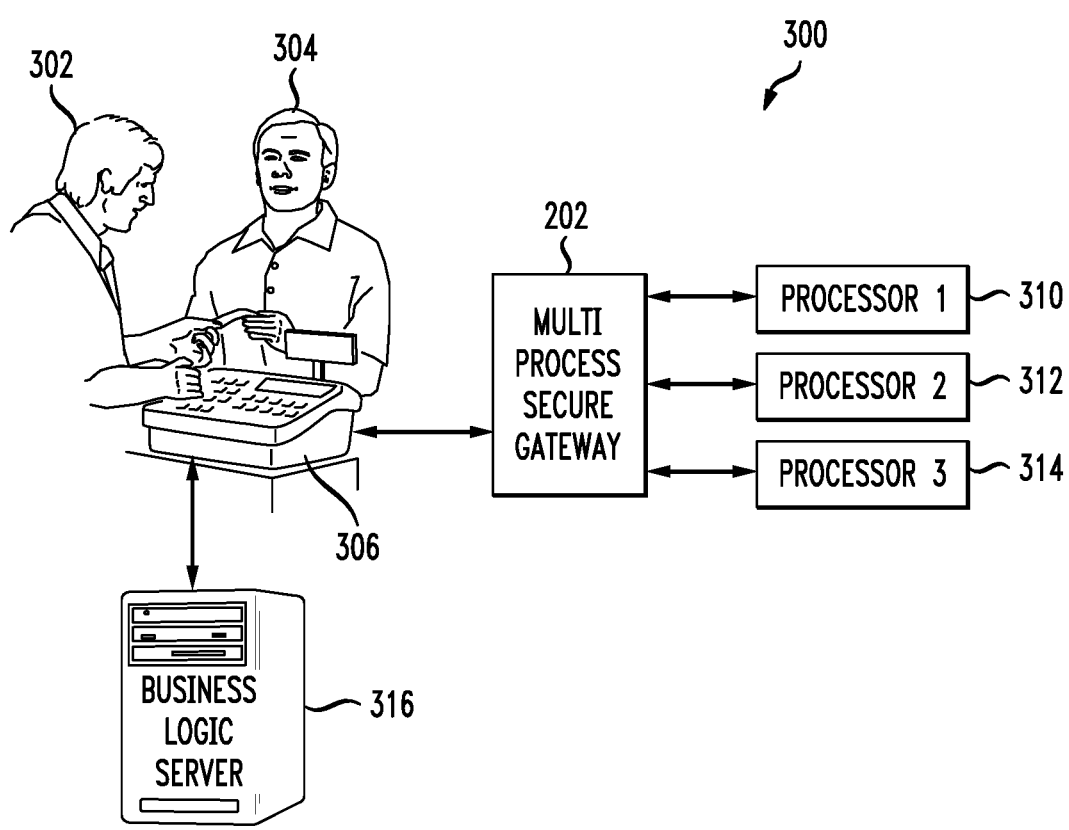
FIG. 3 illustrates a merchant interaction with a secure gateway.

FIG. 3 illustrates a user 302 and merchant 304 interaction 300 with a secure gateway 202. A user or consumer 302 approaches a merchant 304. The user 302 tenders a closed loop card/code to the merchant 304 which the merchant 304 did not issue. For example, the user 302 presents a $50 Famous Footwear gift card/code at a K-Mart store. The merchant 304 swipes the card/code or enters identifying information into a point of sale device 306. The point of sale device queries a multi-process secure gateway 202. The multi-process secure gateway 202 analyzes the submitted information from the closed loop card/code to determine which processor issued it. The secure gateway 202 interacts with multiple processors 310, 312, 314. These can be the same or different processors 214 as shown in FIG. 2. The secure gateway 202 determines that the closed loop card/code is valid and retrieves a balance. The secure gateway 202 further determines an offer price to purchase the closed loop card/code and returns the balance and the offer price to the point of sale device 306. The point of sale device displays the balance and/or the offer price to the merchant 304. The merchant 304 can then offer to the user 302 to accept the offer price for the closed loop card/code as full or partial payment for goods or services of the merchant 304. In some cases, the merchant's point of sale equipment 306 includes or interacts with a business logic server 316. The business logic server 316 considers various factors, such as the type of closed loop card/code, how direct the competition is between the merchant 304 and the issuer of the closed loop card/code, whether the user is a repeat customer, the merchant's inventory, the merchant's capacity to handle new customers, the time of day, and/or other various factors. The business logic server 316 can calculate how valuable the user's business is to the merchant 304 and what premium the user's business is worth over the offer price received from the secure gateway 202. The point of sale device 306 can also display a third value from the business logic server in addition to the closed loop card/code balance and the offer price from the secure gateway. At this point, the merchant 304 can make an informed decision whether to accept the closed loop card/code and what value to assign to the closed loop card/code. Any merchant can accept closed loop card/codes through the secure gateway's API. Merchant can decide to take the 20% loss or whatever the spread is to take the customer's business away from competitor-issued business card/codes.

Figure 4:
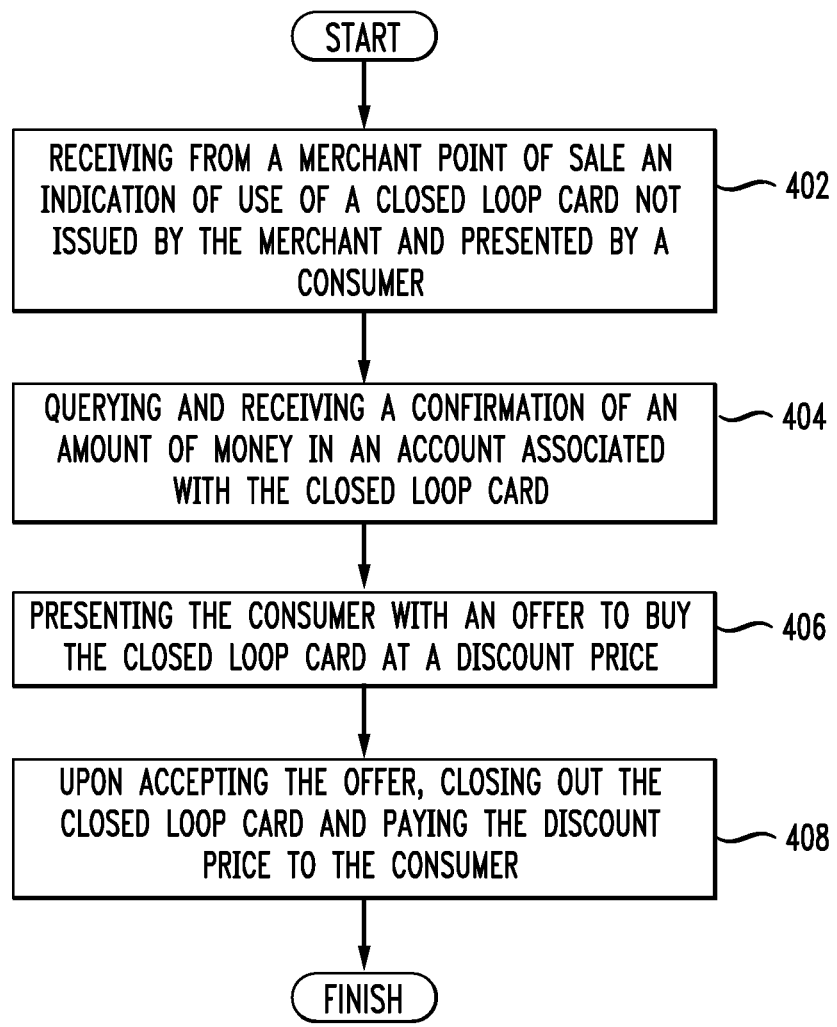
FIG. 4 illustrates an example method embodiment.

FIG. 4 illustrates an example method embodiment of redeeming a closed loop card/code funded with an amount of money. The method can be practiced by a properly configured system 100 as shown in FIG. 1 or as embodied in gateway 202 or in some other configuration such as a compute cluster or other multi node environment. The system first receives from a merchant point of sale an indication of use of a closed loop card/code not issued by the merchant and presented by a consumer (402). The consumer or merchant can swipe the closed loop card/code through a card/code reader to read information identifying the closed loop card/code. The card/code owner or merchant can also insert the card/code into a card/code reader within a kiosk in a manner similar to an Automated Teller Machine (ATM). In one aspect, a kiosk or other location which accepts and/or reads physical closed loop card/codes can include a recycling receptacle for collecting used card/codes. The collected used card/codes can be recycled or destroyed. Certain closed loop card/code issuers may require this feature to keep deactivated or invalid card/codes out of circulation. The system and/or the merchant can restrict the amount of money the owner of the closed loop card/code can redeem over a period of time. The system and/or the merchant can also restrict the number of card/codes redeemed over a period of time. For example, the system can impose a $1,000 per month or 3 card/code per day limit. The system and/or the merchant can require the card/code owner to create or log in to an account to redeem closed loop card/codes. The system and/or the merchant can also request that card/code owners enter driver's license information, social security number, credit card/code information, and/or any other information. This information can be used to direct any payments to the owner and can also be used to check that the owner is not engaged in fraud with the closed loop card/code.

The system queries and receives a confirmation of an amount of money in an account associated with the closed loop card/code (404). The system can query and receive a confirmation of the amount of money from a multi-process secure gateway which communicates with one or more closed loop card/code processors. The system presents the consumer with an offer to buy the closed loop card/code at a discount price (406). Upon accepting the offer, the system closes out the closed loop card/code (i.e. draws down the money in the card/code to zero) and pays the discount price to the consumer (408). Paying the discount price can include applying the discount price to a purchase by the consumer at the merchant or paying the merchant directly. The merchant can provide cash back to the consumer for the excess value of the discount price over the purchase by the consumer at the merchant. Alternatively, the system can deposit any excess value of the discount price in the consumer's account or issue a new gift card/code or coupon code to the consumer. The merchant can apply more than the offered discount price to the purchase in order to entice potential customers. The system can pay the discount price by applying the discount price to a merchant specific card/code of the consumer.

In one aspect, the merchant, Applebee's, offers to trade the Chili's closed loop card/code for an Applebee's closed loop gift card/code at a more favorable rate than the secure gateway offers. In this way, merchants can pay a small price, i.e. the premium over the secure gateway's offer, to attract customers. Consumers may want this functionality to convert a gift card/code with an undesirable merchant to a gift card/code with a more desirable merchant for themselves or to give to another. The merchant can personalize the new card/code based on input text, data, images, sounds, or other information from the user.

In another example, the merchant receives from the owner a set of smaller values totaling a sum equal to or lesser than the amount of money in the closed loop card/code account and divides the amount of money in the closed loop account into gift card/codes in denominations of the set of smaller values. The merchant provides these gift card/codes to the owner as payment. A concrete example of this scenario is a user who submits a $300 gift card/code to Domino's, but does not like Domino's pizza. The user can present the $300 gift card/code to Papa John's, which determines that the card/code is worth $175. The user can split that $175 into a current purchase and open or closed loop gift card/codes in varying denominations. The user can purchase $100 of pizza from Papa John's and receive a $50 gift card/code and a $25 gift card/code from Papa John's. The user can then regive these gift card/codes to others. The user can request that the system or the merchant deliver the gift card/codes to a third party as a gift. Users can request that the system or merchant hold the gift card/code and deliver it on a specific day to a specific person. Users can further provide a personalized message for delivery with the gift card/code. In one aspect, the system or merchant provides users with a management interface to edit details of held gift card/codes, such as cancelling the hold, delivering early, editing the personalized message, and other management functions. In one aspect, the reseller purchases a gift card/code from a user at or above its face value, i.e. purchases a $100 Sears gift card/code for $100 or for $110. In this case, the reseller can make a profit by providing the payment for the gift card/code on a general purpose reloadable card/code run by the reseller. Then the reseller makes by interest, float, interchange, and/or monthly minimum fees. The reseller method described herein may also be provided as a tool by another entity that franchises or receives a fee for use of the tool.

The system can provide a mechanism for applying funds on an unwanted closed loop gift card/code toward payments of a bill (utility bill, car loan, student loan payment, cell phone bill, etc.) As an example, Tom presents a $50 Sears gift card/code to a Cash4Card site, which offers Tom $40 for the card/code. Tom elects to receive the $40 by way of entering the Third Party they wish to pay the funds to, and the Cash4Card site makes payment on Tom's behalf. The Cash4Card site can then prompt Tom to enter additional information, such as an account number, invoice number, or bill number.

In another variation, the owner had a $100 closed loop gift card/code and purchased merchandise or services with it such that $32.31 remained on the gift card/code. The merchant offers to purchase the $32.31 card/code for $19.39. The owner wants to convert the offered purchase price to a gift card/code, but doesn't want to give a gift card/code with a non-round number. The user can pay extra money in addition to the offered purchase price to obtain a gift card/code with the desired round number, such as an extra $0.61 to round up to $20 or an extra $5.61 to round up to $25.

In a related embodiment, the system redeems a closed loop card/code funded with an amount of money. The system receives from a merchant an indication of use of a closed loop card/code not issued by the merchant and presented by a consumer at a merchant point of sale, queries and receives a confirmation of an amount of money in an account associated with the closed loop card/code, receives an indication from the merchant that the consumer has accepted an offer to sell the closed loop card/code, and based on the received indication, closes out the closed loop card/code and pays a second amount the merchant. The merchant can apply a discount to a purchase by the consumer based on the amount paid to the merchant. The merchant can provide cash back to the consumer for excess value over the second amount paid to the merchant. The merchant can apply a discount greater than the second amount.

Online merchants can also accept other online or offline merchant gift codes. The type of merchant does not matter, i.e. a shoe retailer can accept payment as a gift code or gift card from an electronics retailer. For example, amazon.com can accept coupon codes from buy.com or ebay.com. Online merchants can complete these redemptions in the online merchant shopping cart, as opposed to a POS in an offline setting, using all the same API's and displaying to the buyer online in the cart the amount they can get for the unwanted third party merchant card/code at checkout. The online merchants can incorporate the API's themselves or access a service which implements the API's. For example, at checkout a merchant displays online to the buyer a prompt to 'Enter the Gift Code' and the buyer sees a drop down list of merchants from which this merchant accepts gift codes. The buyer then selects the appropriate merchant from the drop down list and enters the gift code number. When the buyer enters the gift code, the online merchant can display the redeemable value of that gift code. The buyer can then decide whether or not to use the discount associated with that gift code.

Figure 5:
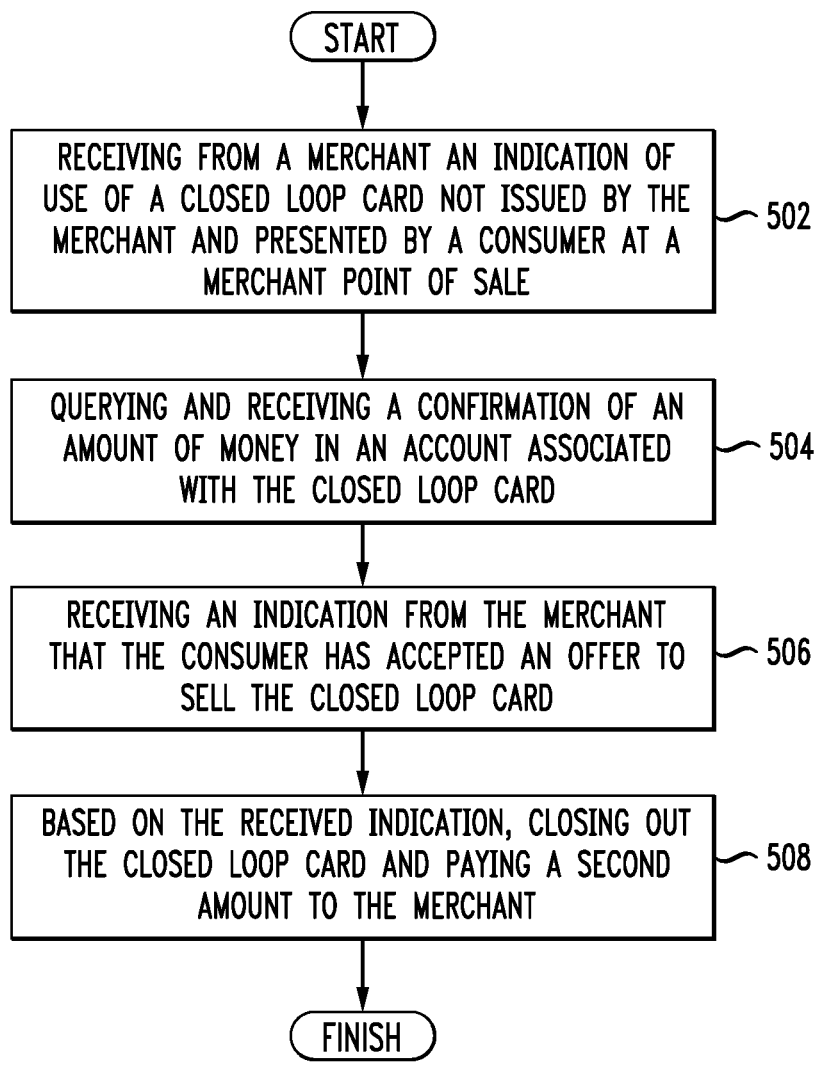
FIG. 5 illustrates another example method embodiment.

FIG. 5 illustrates an example method embodiment of redeeming a closed loop card/code funded with an amount of money. The method can be practiced by a properly configured system 100 as shown in FIG. 1 or as embodied in gateway 202 or in some other configuration such as a compute cluster or other multi node environment. The system first receives from a merchant an indication of use of a closed loop card/code not issued by the merchant and presented by a consumer at a merchant point of sale (502). The system then queries and receives a confirmation of an amount of money in an account associated with the closed loop card/code (504). The system receives an indication from the merchant that the consumer has accepted an offer to sell the closed loop card/code (506). Then, based on the received indication, the system closes out the closed loop card/code and paying a second amount to the merchant (508). The variations set forth above also apply to the method shown in FIG. 5.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving an indication from a device of a desire by a user to sell a closed loop account issued by another merchant not associated with a merchant that the user desires to make a purchase from, wherein the closed loop account is issued for use with a single entity;
   receiving a confirmation, via a computing device, of an amount of money in the closed loop account by accessing a database of accounts over the Internet;
   transmitting, to the device, an offer to buy the closed loop account;
   receiving from the device an acceptance of the offer;
   cancelling the closed loop account based on the acceptance to yield a cancelled closed loop account; and
   creating a new closed loop account issued by the merchant and only available for use at the merchant, the new closed loop account funded by at least a portion of funds from the cancelled closed loop account.

2. The method of claim 1, wherein the closed loop account is represented by one of a physical card, a code, and a credit.

3. The method of claim 1, wherein the closed loop account is represented by a physical card, and the indication identifies a code associated with the closed loop account.

4. The method of claim 1, wherein the acceptance of the offer is received at one of a physical store of the merchant and an online portal.

5. The method of claim 1, wherein a benefit is applied, after creating the new closed loop account, to a third party designated by the merchant.

6. The method of claim 1, wherein the new closed loop account issued by the merchant is represented by one of a physical card, a code, or a credit.

7. The method of claim 5, wherein the benefit comprises one of a physical card, a code, and a credit.

8. The method of claim 1, further comprising:
   presenting at least one of a discount and cash back in association with a purchase on the mobile device using the new closed loop account; and
   applying the at least one of the discount and the cash back to the purchase upon receiving an acceptance of the at least one of the discount and the cash back from the mobile device.

9. A system comprising:
   a processor; and
   a non-transitory computer-readable storage device storing instructions which, when executed by the processor, cause the processor to perform operations comprising:
   receiving an indication from a device of a desire by a user to sell a closed loop account issued by another merchant not associated with a merchant that the user desires to make a purchase from, wherein the closed loop account is issued for use with a single entity;
   receiving a confirmation of an amount of money in the closed loop account by accessing a database of accounts over the Internet;
   transmitting, to the device, an offer to buy the closed loop account;
   receiving from the device an acceptance of the offer;
   cancelling the closed loop account based on the acceptance to yield a cancelled closed loop account; and
   creating a new closed loop account issued by the merchant and only available for use at the merchant, the new closed loop account funded by at least a portion of funds from the cancelled closed loop account.

10. The system of claim 9, wherein the closed loop account is represented by one of a physical card, a code, and a credit.

11. The system of claim 9, wherein the closed loop account is represented by a physical card, and the indication identifies a code associated with the closed loop account.

12. The system of claim 9, wherein the acceptance of the offer is received at one of a physical store of the merchant and an online portal.

13. The system of claim 9, wherein a benefit is applied, after creating the new closed loop account, to a third party designated by the merchant.

14. The system of claim 9, wherein the new closed loop account issued by the merchant is represented by one of a physical card, a code, or a credit.

15. The system of claim 13, wherein the benefit comprises one of a physical card, a code, and a credit.

16. The system of claim 9, wherein the non-transitory computer-readable storage device further stores instructions which, when executed by the processor, cause the processor to perform operations comprising:
   presenting at least one of a discount and cash back in association with a purchase on the mobile device using the new closed loop account; and
   applying the at least one of the discount and the cash back to the purchase upon receiving an acceptance of the at least one of the discount and the cash back from the mobile device.

17. A non-transitory computer readable storage device having instructions stored therein, which, when executed by a computing device, cause the computing device to perform operations comprising:

receiving an indication from a device of a desire by a user to sell a closed loop account issued by another merchant not associated with a merchant that the user desires to make a purchase from, wherein the closed loop account is issued for use with a single entity;

receiving a confirmation of an amount of money in the closed loop account by accessing a database of accounts over the Internet;

transmitting, to the device, an offer to buy the closed loop account;

receiving from the device an acceptance of the offer;

cancelling the closed loop account based on the acceptance to yield a cancelled closed loop account; and creating a new closed loop account issued by the merchant and only available for use at the merchant, the new closed loop account funded by at least a portion of funds from the cancelled closed loop account.

18. The non-transitory computer readable storage device of claim 17, wherein the closed loop account is represented by one of a physical card, a code, and a credit.

19. The non-transitory computer readable storage device of claim 17, wherein the closed loop account is represented by a physical card, and the indication identifies a code associated with the closed loop account.

20. The non-transitory computer readable storage device of claim 17, wherein the acceptance of the offer is received at one of a physical store of the merchant and an online portal.

21. The non-transitory computer readable storage device of claim 17, having further instructions stored therein, which, when executed by the computing device, cause the computing device to perform operations comprising:

presenting at least one of a discount and cash back in association with a purchase on the mobile device using the new closed loop account; and applying the at least one of the discount and the cash back to the purchase upon receiving an acceptance of the at least one of the discount and the cash back from the mobile device.

* * * * *